United States Patent [19]
Inuiya et al.

[11] Patent Number: 5,559,552
[45] Date of Patent: Sep. 24, 1996

[54] MOVIE CAMERA WITH STROBE LIGHT

[75] Inventors: Masafumi Inuiya; Yoshiaki Nakayama, both of Tokyo, Japan

[73] Assignee: Fuji Photo Film Company, Ltd., Kanagawa-ken, Japan

[21] Appl. No.: 300,230

[22] Filed: Sep. 6, 1994

Related U.S. Application Data

[63] Continuation of Ser. No. 188,117, Jan. 28, 1994, abandoned, which is a continuation of Ser. No. 873,104, Apr. 24, 1992, abandoned.

[30] Foreign Application Priority Data

Apr. 26, 1991 [JP] Japan ..................... 3-097388

[51] Int. Cl.$^6$ .................................. H04N 5/225
[52] U.S. Cl. ................... 348/220; 348/371; 348/223
[58] Field of Search ..................... 348/207, 220, 348/221, 223, 229, 231, 362, 363, 370, 371; 358/335; 354/410; H04N 5/225

[56] References Cited

U.S. PATENT DOCUMENTS

| | | | |
|---|---|---|---|
| 4,837,628 | 6/1989 | Sasaki | 348/220 |
| 4,860,108 | 8/1989 | Saito et al. | 358/209 |
| 4,881,127 | 11/1989 | Isoguchi et al. | 358/213.19 |
| 4,910,606 | 3/1990 | Kinoshita et al. | 348/220 |

FOREIGN PATENT DOCUMENTS

2-130080  5/1990  Japan ................ H04N 5/238

Primary Examiner—Wendy Garber
Assistant Examiner—Tuan V. Ho

[57] ABSTRACT

A movie camera having: a strobe light for illuminating a subject; a shutter speed switching circuit for changing speeds of a shutter for the charge coupled device (CCD); a white balance switching circuit for adjusting the balance between color signals; an automatic gain control (AGC) circuit for adjusting amplifying gain for an image signal; a control circuit for energizing the shutter speed switching circuit so that a flash of the strobe light is terminated within the storing time of the CCD by changing the shutter speed to a higher speed, for energizing the white balance switching circuit so that the white balance is adjusted to coincide with the color temperature of the strobe light, and for fixing the gain of the AGC circuit. Accordingly, clear pictures having uniform brightness are obtained in each shot by terminating a flash of the strobe light within the storing time of CCD and by switching the shutter speed to a higher speed, and fluctuation of the brightness of pictures shot after a flash of the strobe light is prevented by fixing the gain of an AGC circuit and by making the white balance coincide with the color temperature of the strobe light.

8 Claims, 8 Drawing Sheets

MOVIE CAMERA WITH STROBE LIGHT

This application is a continuation of application Ser. No. 08/188,117 filed on Jan. 28, 1994, now abandoned; which was a continuation of application Ser. No. 07/873,104 filed on Apr. 24, 1992, now abandoned.

BACKGROUND OF THE INVENTION

1. Field of the Invention

The present invention relates to movie cameras, and more particularly, to a movie camera with a strobe light for shooting a still shot or picture in synchrony with a flash of the strobe light.

2. Description of the Related Art

Recently, a type of video camera whereby moving pictures (hereafter referred to as a "movie") can be easily produced, is becoming popular. In a movie camera of this type, image information is recorded by a magnetic head on a magnetic tape housed in a video cassette. Movie images of, for instance, scenes from various sports shot by the movie camera are reproduced on a cathode-ray tube (CRT) and watched by, for instance, people who want to analyze their form during their play.

Such cameras employ a solid state sensing device for converting image information corresponding to light incident thereon, into electrical signals. A common device is a charge coupled device (CCD). Furthermore, a CCD may have an electronic "shutter", briefly explained as follows, with details specified in Japanese Application No. 63-282600, Laid-Open No. 1990-130080 (Kamikubota et al). The storage time for such a device has a first period, wherein all charges stored are discarded at the end thereof, followed immediately by a second period, wherein all charges stored are read and outputted. In this way, the CCD has an electronic "shutter", wherein the "shutter" is "closed" during the first period and "opened" during the second period.

For these usages of the movie camera, it is advantageous to develop a method for obtaining clear successive pictures free of a blur of the subject, shot at a high shutter speed using a strobe light. However, if the strobe light is flashed without synchronization with the storing time of the CCD, uniform brightness between pictures cannot be expected because the amount of exposing light differs from picture to picture. On the other hand, pictures of a subject moving at a high speed and shot at a low shutter speed have much blur.

Further, there is a problem of sudden fall of gain in an automatic gain control (AGC) circuit when a strobe light is used, because of the sudden increase of amount of light. The AGC circuit requires a relatively long time until the fall of gain is recovered, and hence there arises a problem that the brightness fluctuates between pictures shot after and before a flash of the strobe light.

SUMMARY OF THE INVENTION

It is an object of the present invention to provide a movie camera with a strobe light by which clear pictures having uniform brightness are obtained in each shot by terminating a flash of the strobe light within the storing time of CCD and by switching the shutter speed to a higher speed, and the brightness of pictures shot after a flash of the strobe light is prevented from fluctuation by fixing the gain of an AGC circuit and by making the white balance to coincide with the color temperature of the strobe light.

To realize the above-mentioned object, the movie camera for shooting a movie and for shooting a still shot during a temporary interruption of the movie shooting of the present invention comprises: a photoelectric device for producing an image signal of color signals corresponding to light received from a subject; a shutter associated with said photoelectric device; optical means for receiving said light from a subject and controlling the passage of said light to said photoelectric device, including exposure controlling means for automatically controlling said optical means to adjust the amount of light received by said photoelectric device to obtain optimal exposure of the subject; a strobe light for emitting an electronic flash, to illuminate the subject shutter speed and light source controlling; means, responsive to the interruption for setting the speed of said shutter higher than when shooting the movie, and for controlling said light source so that said flash is synchronized with the opening of said shutter and is terminated before the closing of said shutter; and amplifier for amplifying said image signal; and white balancing means for adjusting said color signals of said image signal so that the white balance of one said image signal which corresponds to an image taken during the interruption, is adjusted for the color temperature of said flash; said exposure controlling means further controls said amplifier to compensate when said optical means has been controlled to maximize the amount of light received and the amount of light received is still insufficient for optimal exposure.

Other objects and advantages of the present invention should be understood from the detailed description with reference to the attached drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
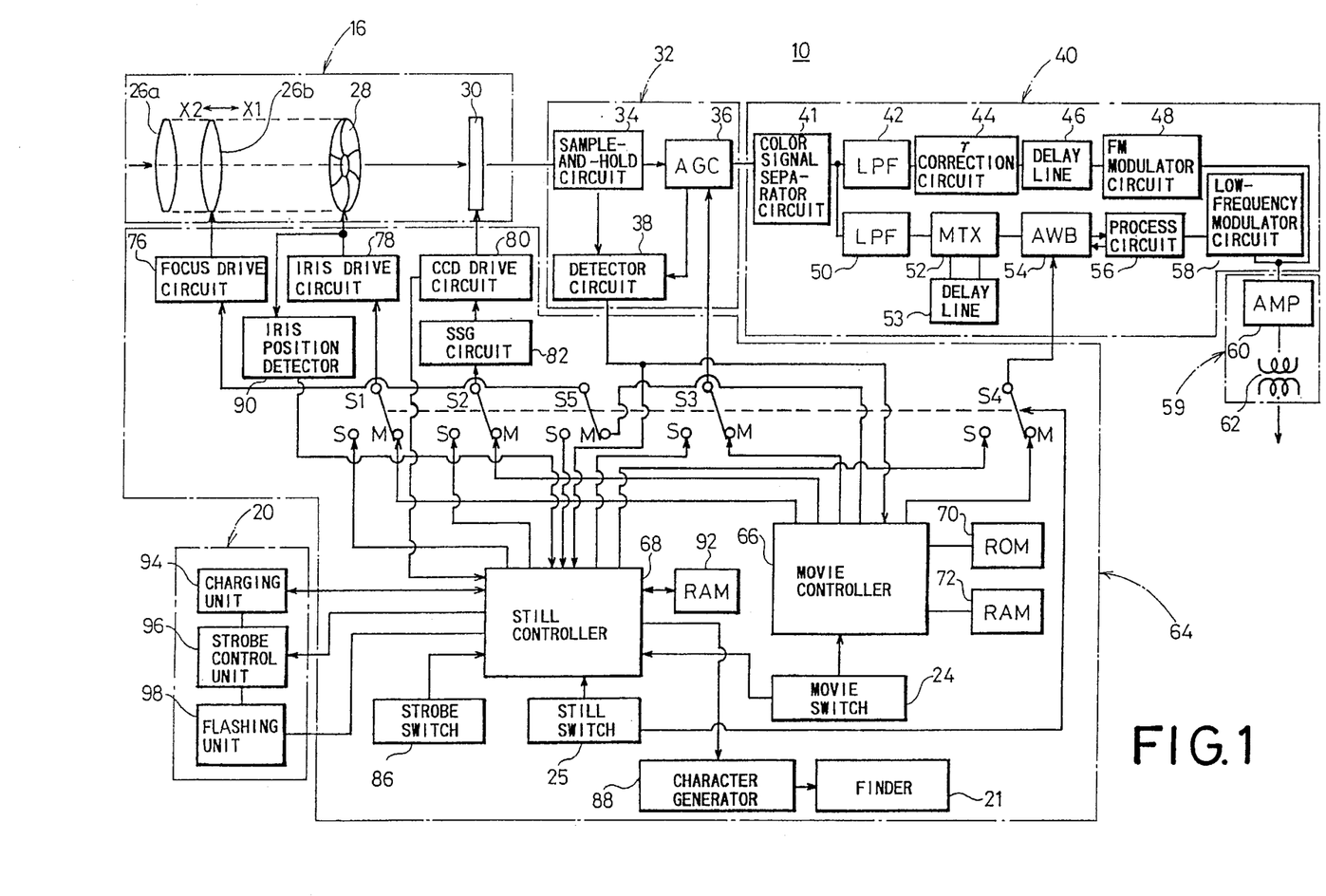
FIG. 1 is a block diagram showing the construction of a movie camera with a strobe light according to an embodiment of the present invention.
Figure 2:
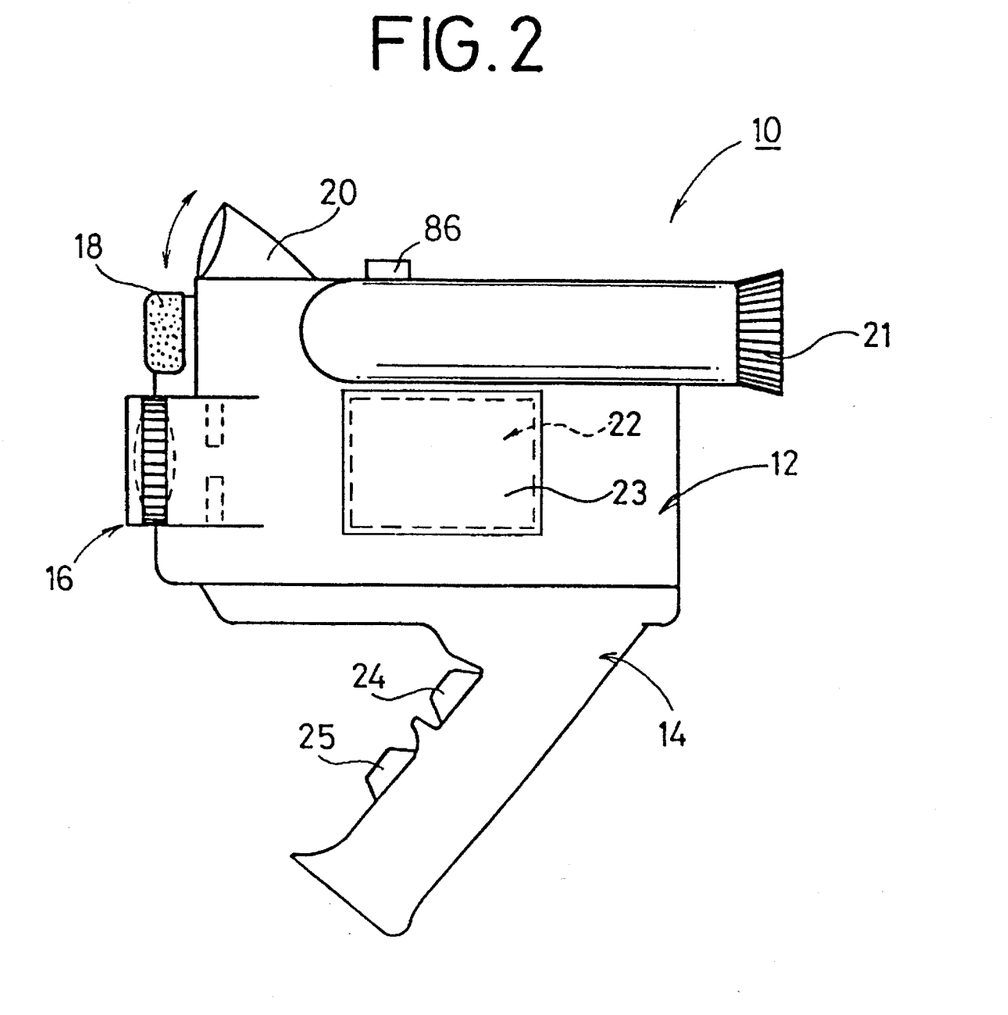
FIG. 2 is a side, partially phantom, view of the movie camera according to an embodiment of the present invention.

FIG. 1 is a block diagram showing the schematic opto-electro-mechanical construction of a movie camera with a strobe light according to an embodiment of the present invention, and FIG. 2 is a side-view of the movie camera.

In FIG. 2, the reference numeral 10 denotes the movie camera, which comprises a camera body 12 and a hand grip 14. The camera body 12 is provided with an optical system 16, a sound gathering microphone 18, a pop-out type strobe light 20 and a view finder 21, together with a conventional cassette loader 23 into which a video cassette 22 is loaded. The grip 14 has a movie switch 24 to start shooting a movie and a still switch 25 to start shooting a still picture.

In FIG. 1, the optical system 16 includes photo lenses 26a and 26b, an iris or a diaphragm 28 and CCD 30 for reading an image focused thereon by the photo lenses 26a and 26b.

A signal processing unit 32 comprises a sample-and-hold circuit 34 for sampling the image signal read by the CCD 30, an AGC circuit 36 as a gain controller in amplifying the image signal, and a detector circuit 38 for extracting signals from the image signal to control the opening of the iris 28 and focusing of photo lenses 26a and 26b.

An image processing unit 40 comprises a color signal separator circuit 41 for separating image signal into the color signals of the three primary colors, a low-pass filter (LPF) 42 for extracting a luminance signal from the color signals, a γ correction circuit 44 for making γ correction of the luminance signal, a delay line 46 for making contour enhancement and an FM modulator circuit 48 for FM modulating the luminance signal after the treatments stated above. The image processing unit 40 further comprises an LPF 50 for extracting color signals CR and CB and a luminance signal YL from the image signal outputted by the color signal separator circuit 41, a matrix (MTX) circuit 52 for converting these signals to color signals R1, G1 and B1, a delay line 53 connected to the MTX circuit 52, an Auto White Balance (AWB) circuit 54, a process circuit 56 for converting the three primary color signals R, G and B into a chroma signal and a low-frequency modulator circuit 58 for making low-frequency modulation of the chroma signal.

An image recording unit 59 comprises an amplifier (AMP) 60 for amplifying output signals outputted from the FM modulator circuit 48, and low-frequency modulator circuit 58, and a magnetic head 62 for recording image information onto the video cassette 22.

A control unit 64 comprises a movie controller 66 and a still controller 68. The movie controller 66 reads from Read Only Memory (ROM) 70, programs for controlling the movie camera 10, and is responsive to the movie switch 24 and the detector circuit 38. When in movie mode (i.e. movie switch 24 is activated), movie controller 66 is operatively connected to a focus drive circuit 76 for driving the photo lens 26b, an iris drive circuit 78 for opening and closing the iris 28, a Synchronism Signal Generator (SSG) circuit 82 for outputting a synchronism signal to energize a CCD drive circuit 80, the AGC circuit 36 and the AWB circuit 54.

The iris drive circuit 78 is connected with the movie controller 66 via a switch S1, as the iris drive circuit 78 is connected with a common terminal of the switch S1, and an M-side terminal of the switch S1 is connected with the movie controller 66. In the same manner, the SSG circuit 82 via a switch S2, the AGC circuit 36 via a switch S3, the AWB circuit 54 via a switch S4, and the focus drive circuit 76 via a switch S5, are respectively connected with the movie controller 66.

Output terminals of the still controller 68 are connected, via respective S-side terminals of the switches S1 to S5, with the iris drive circuit 76, SSG circuit 82, AGC circuit 36, AWB circuit 54, and focus drive circuit 76, and the connections are perfected when the switches S1 to S5 are turned to S-sides. The still controller 68 is deactivated by a movie switch 24 for shooting a movie. Still controller 68 is activated by a still switch 25 for shooting a still image a strobe switch 86, manually switchable, for activating the strobe light 20 together with the detector circuit 38, an iris position detector 90 and a random access memory (RAM) 92. Strobe light 20 is driven by the still controller 68 when strobe switch 86 and still switch 25 are activated, and comprises a charging unit 94, a strobe controller unit 96 and a flashing unit 98. A flash and a sequence of flashes of strobe light 20, are respectively effected by the manual activation of strobe switch 86, as a predetermined function of the duration of the activation. The CCD drive circuit 80 is connected to the still controller 68. The view finder 21 is connected to the still controller 68 via character generator 88.

An output terminal of the still switch 25 is connected with respective control terminals of the switches S1 to S5, and by triggering the still switch 25, the switches S1 to S5 are switched over.

Figure 3:
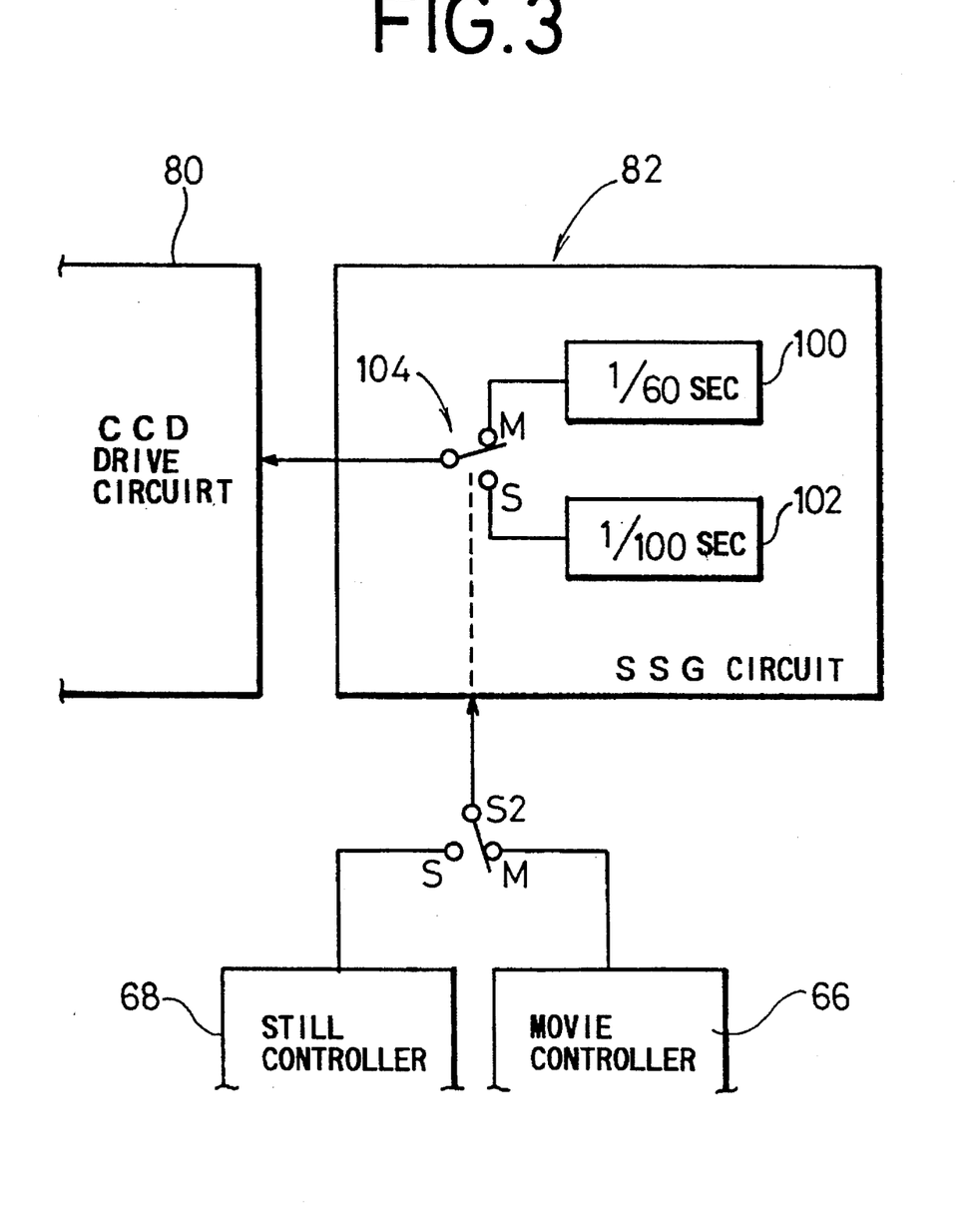
FIG. 3 is a block diagram showing the construction of a SSG circuit of the movie camera according to an embodiment of the present invention.
Figure 4:
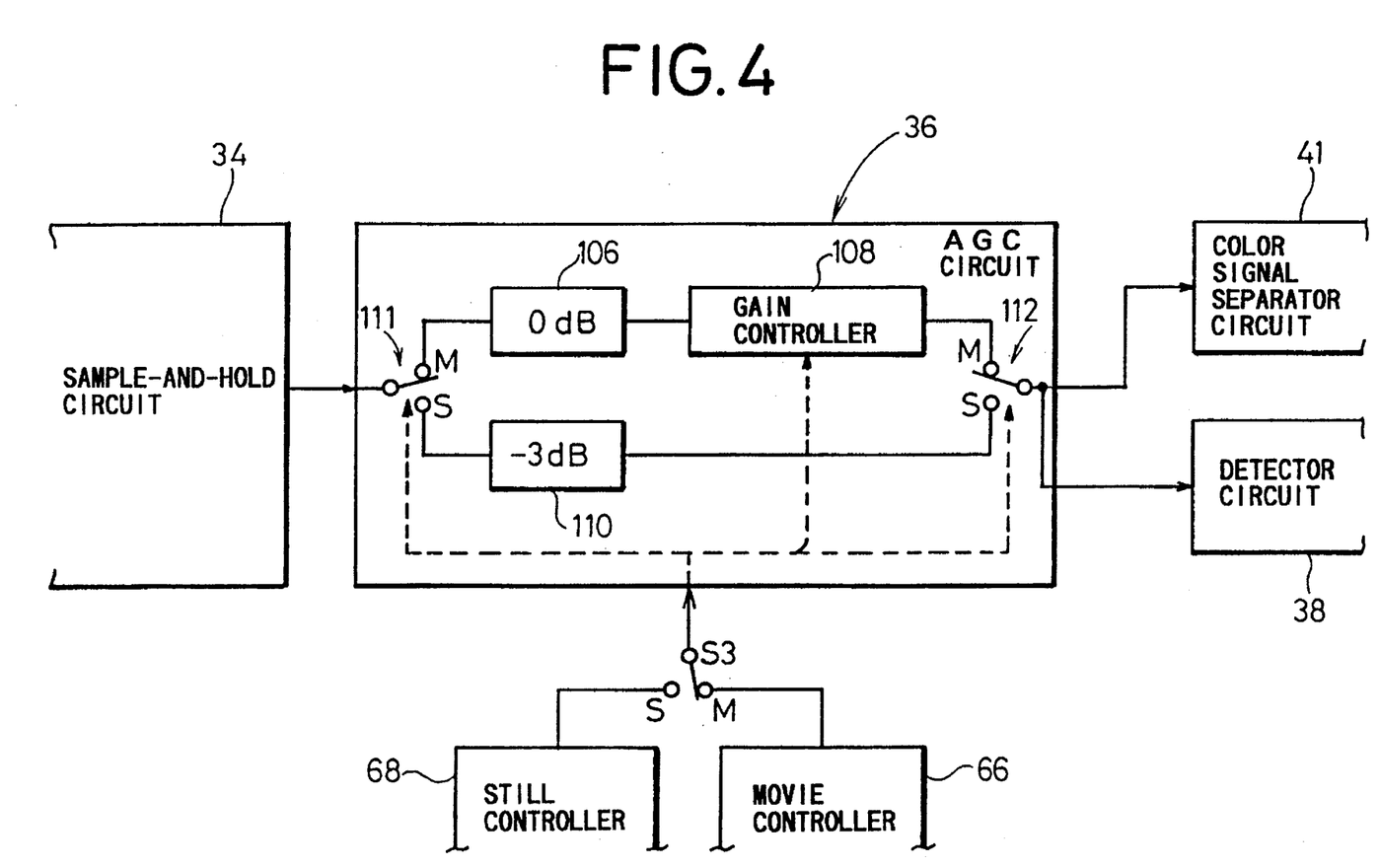
FIG. 4 is a block diagram showing the construction of an AGC circuit of the movie camera according to an embodiment of the present invention.
Figure 5:
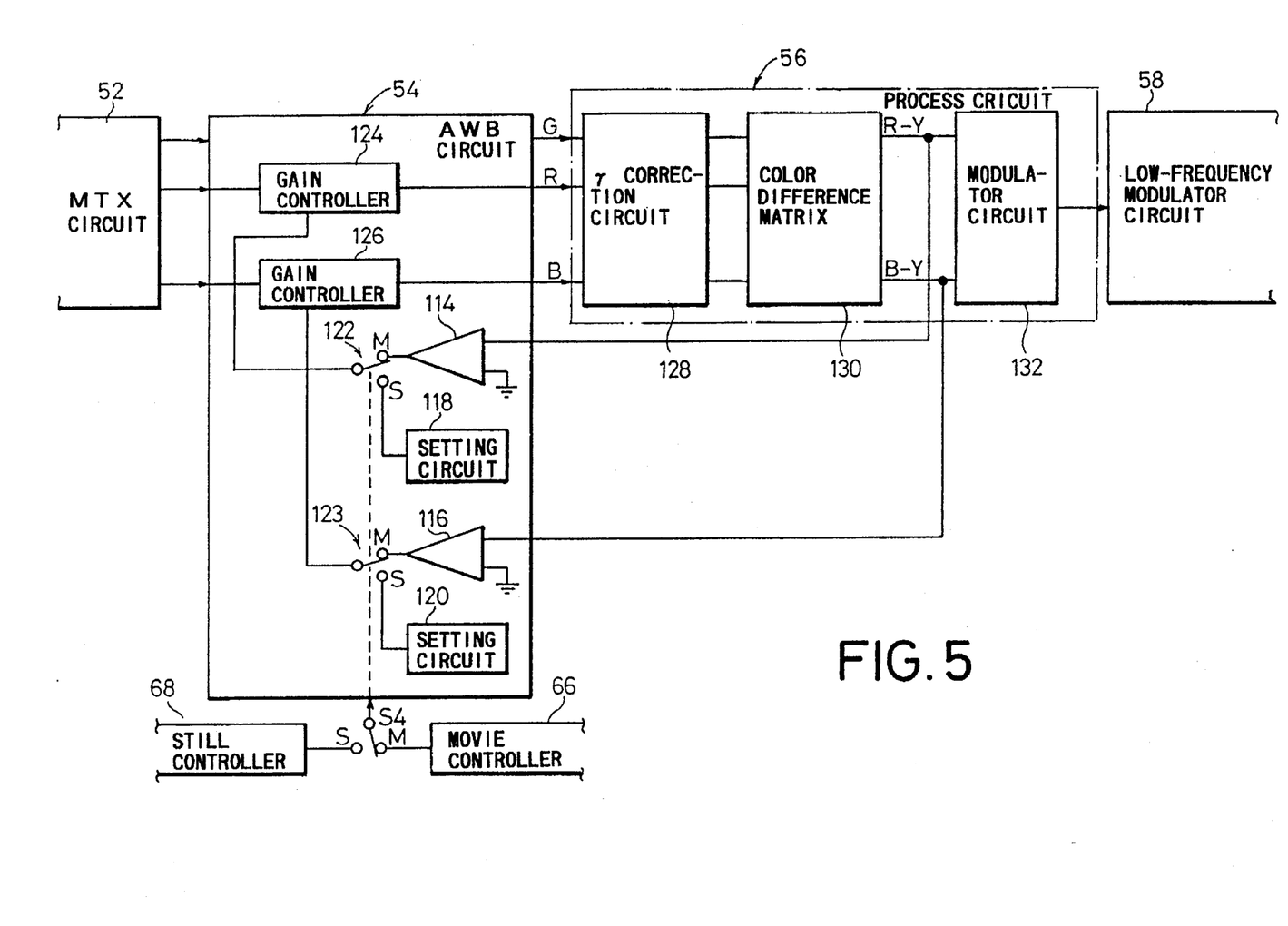
FIG. 5 is a block diagram showing the construction of an AWB circuit and a process circuit of the movie camera according to an embodiment of the present invention.

FIGS. 3 to 5 are block diagrams showing the construction of the SSG circuit 82, AGC circuit 36 and AWB circuit 54.

As illustrated by FIG. 3, the SSG circuit 82 comprises a CCD shutter speed setting circuit 100 for setting the CCD shutter speed at 1/60 sec., another shutter speed setting circuit 102 for setting at 1/100 sec. and a shutter speed switch 104 for changing the shutter speeds.

The AGC circuit 36 illustrated by FIG. 4 comprises a gain setter 106 for setting a reference gain to zero (0) db, a gain controller 108 connected thereto, another gain setter 110 for setting another reference gain to minus three (−3) db. There are also switches 111 and 112 linked to switch 53, whereby the gain of AGC circuit 36 is equal to the gain of reference gain setter 110 (i.e. −3 dB), when linked switches 111 and 112 are set to S-side; and equal to the gain of reference gain setter 106 (i.e. 0 dB) plus the gain of gain controller 108, when linked switches and 112 are set to the M-side.

FIG. 5 is a block diagram showing the construction of the AWB circuit 54 and process circuit 56. A R-Y signal outputted from the process circuit 56 is fed to an input terminal of a calculating circuit 114 in the AWB circuit 54 for calculating a suitable white balance, and an output signal of the calculating circuit 114 is fed to a gain controller 124, via the M-side terminal of a switch 122. Similarly, a B-Y signal outputted by the process circuit 56 is fed to an input terminal of another calculating circuit 116, and an output thereof is fed to another gain controller 126, via the M-side terminal of another switch 123. The S-side terminal of the switch 122 is connected with a white balance setting circuit 118 and the S-side terminal of the switch 123 is connected with a white balance setting circuit 120, and both white balance setting circuits 118 and 120 are for setting a white balance value adjusted to the color temperature of the strobe light.

The process circuit 56 is provided with a γ correction circuit 128, a color difference MTX 130 and a modulator circuit 132 for making frequency modulation.

Next, the operation of the movie camera 10 constituted as stated above will be explained with reference to FIGS. 1 to 6.

To begin with, as the movie switch 24 is activated, the movie controller 66 reads initial values of shutter speed (1/60 sec.), AGC gain (0 db reference) and the like, from RAM 72 set for shooting movie pictures and turns the switches 104, 111, 112, 122 and 123 to their respective movie sides (respective M-sides shown in FIGS. 3, 4 and 5). The SSG circuit 82 outputs vertical sync signals at every ¹⁄₆₀ sec. via the CCD drive circuit 80 to the CCD 30. The CCD 30, driven by the vertical sync signals, electrically reads image information made thereon and outputs the image signal.

The image signal, after being sampled and held by the sample-and-hold circuit 34, is outputted to the AGC circuit 36 and detector circuit 38. The image signal inputted to the AGC circuit 36 is outputted via the M-side terminal of the switch 111 to the gain setter 106, gain controller 108, and to the detector circuit 38 and color signal separating circuit 41 via the M-side terminal of the switch 112 (FIG. 4).

The detector circuit 38 extracts information on brightness from the inputted image signal, and information on focusing from the image signal outputted from the sample-and-hold circuit 34. Specifically, the detector circuit 38 extracts focus information and brightness information from the image signals outputted by the sample-and-hold circuit 34 and AGC circuit 36, and outputs such information to the movie controller 66.

With this outputted focus information, (a so-called "front focus" information because the image is focused on the subject side apart from the surface of CCD 30), the movie controller 66 then drives, via the focus drive circuit 76, an actuator (not shown) to move the photo lens 26b towards CCD 30 (in the direction of the arrow X1 in FIG. 1) so that "the image of the subject is focused on the sensing surface of CCD 30.

Similarly, with the outputted information on brightness from the detector circuit 38, for instance, information indicating that the light quantity is less than the proper quantity, the movie controller 66 energizes the iris drive circuit 78 to open the iris 28 to increase the light quantity. The condition of the iris 28 being at its full aperture is detected by the iris position detector 90 and inputted to the still controller 68. If the light quantity is still less than the proper quantity with the iris 28 fully opened (i.e. underexposure), the movie controller 66, in order to attain a proper exposure, outputs a control signal to the AGC circuit 36 to energize an amplifying gain changing switch (not shown) and thereby increases the amplifying gain.

Next, the image signal outputted by the color signal separator circuit 41 is, after being subjected to offset elimination by LPF 42, subjected to a 0.45γ correction by the γ correction circuit 44. After treatment of contour enhancement by the delay line 46, the image signal is modulated by the FM modulator circuit 48 and inputted to the AMP 60.

On the other hand, the image signal outputted by the color signal separator circuit 41 is subjected to extraction of the luminance signal YL and color signals CR and CB by the LPF 50, and converted to the color signals R1, G1 and B1 by the MXT circuit 52 under the action of the delay line 53. The white balance of the color signals R1, G1 and B1 are adjusted by the gain controllers 124 and 126 in the AWB circuit 54, and inputted to the process circuit 56. In the AWB circuit 54, the calculating circuits 114 and 116 calculate correction values based on the R-Y signal and B-Y signal fed back from the process circuit 56 and supply the correction values to the gain controllllers 124 and 126 so that a proper white balance is attained.

The color signals with the white balance adjusted by the AWB circuit 54, are converted to a chroma signal by the process circuit 56 and inputted to the AMP 60 after subjected to the low-frequency modulation by the low-frequency modulator 58. The low-frequency modulated chroma signal, together with the FM modulated luminance signal from the FM modulator 48, is amplified by the AMP 60 and thereafter applied to the magnetic head 62 to be recorded as image information on the video cassette 22.

Figures 6A, 6B:
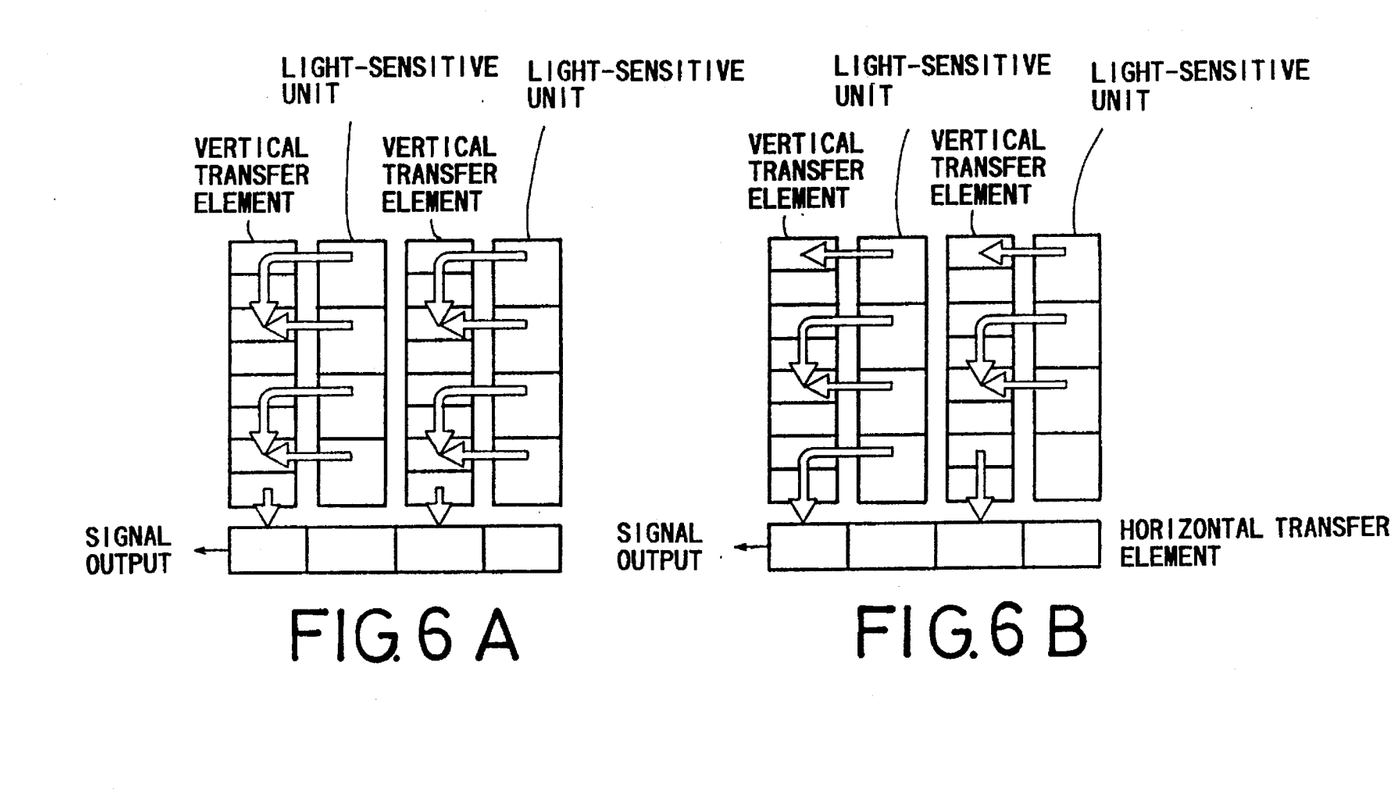
FIGS. 6A and 6B schematically illustrate the accumulation of information in the CCD according to an embodiment of the present invention.

The field accumulation of a signal in the CCD 30 will be explained with reference to FIGS. 6A and 6B, which respectively illustrate a simplified construction of the CCD 30 assumed to have eight (8) pixels or picture cells, in which FIG. 6A shows an odd numbered field and FIG. 6B shows an even numbered field. Each field consists of a vertical transfer unit, a light-sensitive unit having eight picture cells and a horizontal transfer unit which outputs a signal from one end thereof.

In the odd field, signals on each pair of an odd numbered picture cell and the neighboring even numbered picture cell, counted from the horizontal transfer unit side, are simultaneously sent to the vertical transfer unit, and added together there. The above-mentioned signals are those opto-electronically converted signal charges on respective picture cells.

In the even field, on the other hand, with an altered combination of signals to be added together, signals on each pair of an even numbered picture cell and the neighboring odd numbered picture cell are sent to and added together on the vertical transfer unit. The added signals are transferred vertically in the vertical transfer unit to the horizontal transfer unit, and are transferred horizontally to the end of the horizontal transfer unit to be outputted therefrom. Signals on every picture cell in the light-sensitive unit are thus read out.

Hereafter, another embodiment will be explained with reference to FIGS. 1 to 8, wherein the strobe switch 86 is activated to obtain an image in synchrony with a flash of the strobe light during shot for a movie.

When the strobe switch 86 is activated (step S1 in FIG. 7 and ① in FIG. 8), the switches S1 to S5 are switched-over to their respective S-sides (step S2) and the iris drive circuit 78, SSG circuit 82, AGC circuit 36 and AWB circuit 54 are connected with the still controller 68. On the positive edge of the vertical sync signal generated by SSG circuit 82 immediately after the strobe switch 86 is activated (step S3 in FIG. 7 and ② in FIG. 8), the still controller 68 fixes the iris 28 in its state immeadiately preceding the activation of strobe switch 86, by controlling the iris drive circuit 78 via the switch S1. The still controller 68 also sets the CCD shutter speed to ¹⁄₁₀₀ sec., which is faster than that ordinarily set for a movie, by switching-over the switch 104 in the SSG circuit 82 via the switch S2 (S-side in FIG. 3, step S4 in FIG. 7 and ③ in FIG. 8). The flashing unit 98 of the strobe light 20 is energized and made to flash in synchrony with the ¹⁄₁₀₀ sec. for which the CCD shutter is opened, and the image focused on the CCD 30 is read (step S5 in FIG. 7 and ④ in FIG. 8). The duration of the flash is shorter than ¹⁄₁₀₀ sec. for which the CCD shutter is opened, and terminates before electric charges on the CCD 30 are read.

Figure 7:
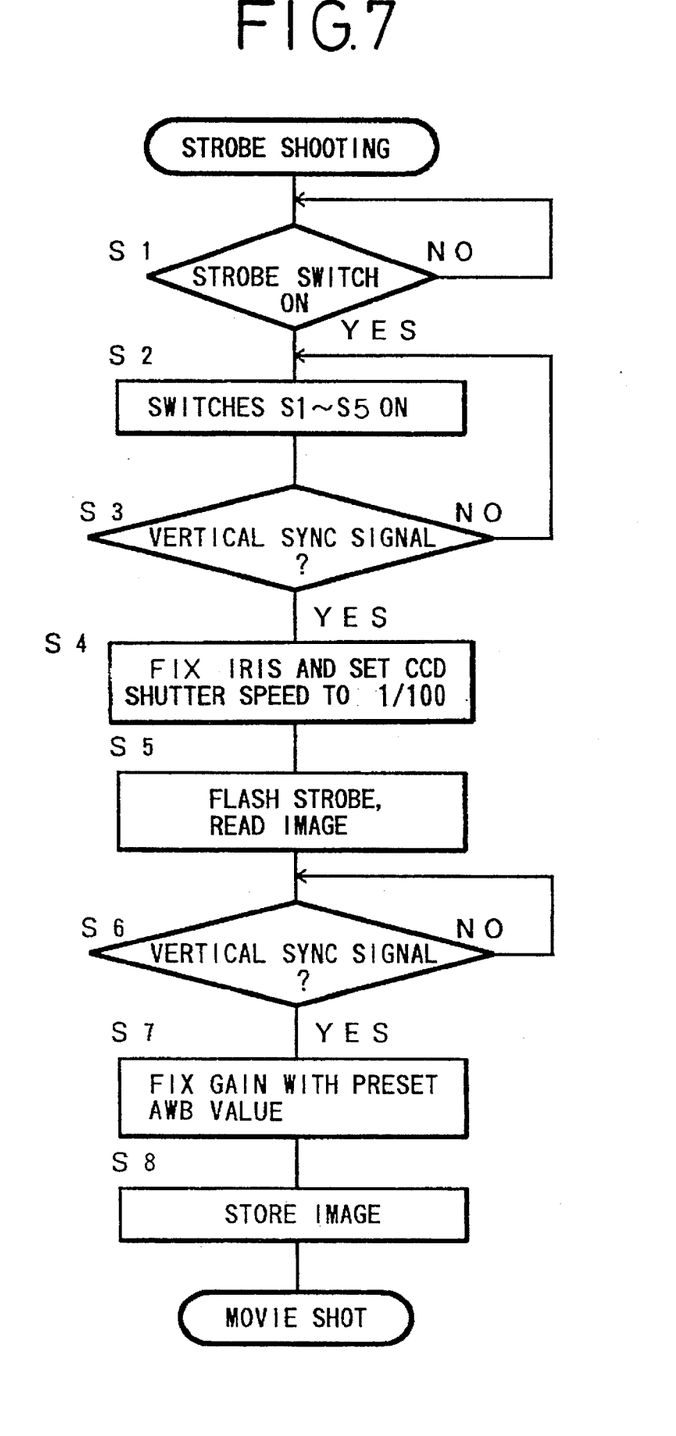
FIG. 7 is a flow-chart showing operation of the movie camera according to an embodiment of the present invention for shooting a still shot in synchrony with a strobe light.
Figure 8:
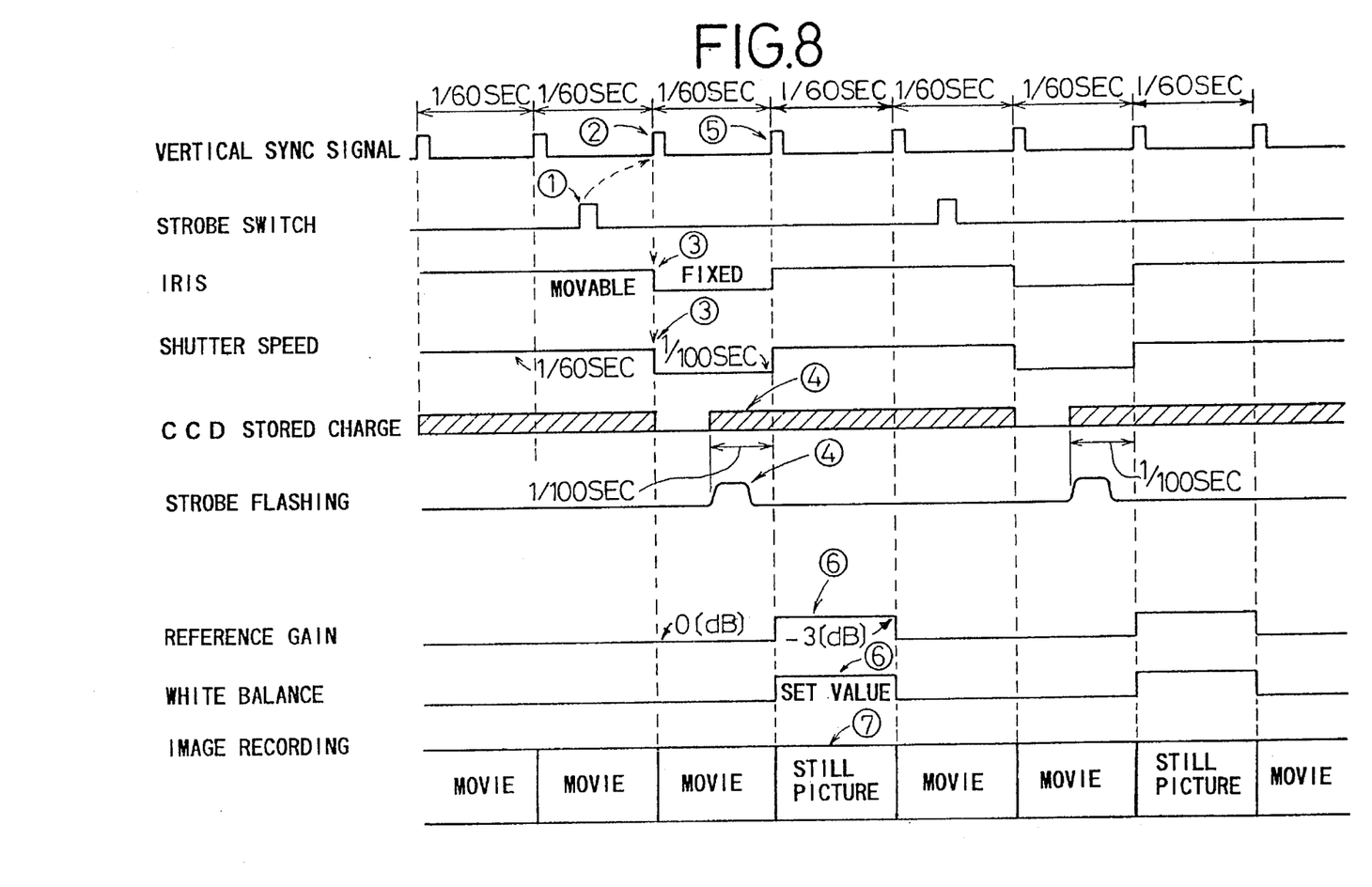
FIG. 8 is a time-chart showing operation of the movie camera according to an embodiment of the present invention for taking a still shot while shooting a movie in synchrony with a strobe light.

When the reading of the image is finished, the still controller 68 switches over the switches 111 and 112 to their S-sides in the AGC circuit 36 via the switch S3 in synchrony with a positive edge of the next vertical sync signal (step S6 in FIG. 7 and ⑤ in FIG. 8), for thereby fixing the amplifying gain for the image signal to −3 db, and the gain in the gain controllers 124 and 126 to values set beforehand by the white balance setting circuits 118 and 120 by switching-over the switches 122 and 123 in the AWB circuit 54 via the switch S4 (step S7 in FIG. 7 and ⑥ in FIG. 8). These values set to the gain controllers 124 and 126 match the white balance value previously set in accordance with the color temperature of the light rays emitted by the strobe light 20.

At the same time, iris 28 is released from its fixed state, and the value of gain controller 108 is set to the value immediately preceding the operation of the strobe switch 86. With reference to FIG. 4, note the gain controller 108 is not active in the still mode (when switch S3 is switched to S-side) but becomes active at such set gain value when the movie mode is returned to.

Accordingly, the image signal read by the CCD 30 under the flash of the strobe light 20 triggered by the first vertical sync signal, is recorded on the video cassette 22 by the magnetic head 62 in the image recording unit 59, via the sample-and-hold circuit 34 synchronized with the second vertical sync signal, the AGC circuit 36 whose amplifying gain for the image signal was set to −3 db, the AWB circuit 54 whose white balance was set to a proper value, and other circuits (step S8 in FIG. 7, and 7 in FIG. 8).

The strobe-synchronized shooting is thus finished. However, if the strobe switch 86 remains activated, the still controller 68 checks the charged condition of the strobe light 20 from the strobe control unit 96, and if it is possible to flash, makes another strobe-synchronized shot in synchrony with the next vertical sync signal following the steps of S1 to S8. Therefore, it is possible, by keeping the strobe switch 86 activated, to obtain a series of pictures shot at intervals required for charging the strobe light in synchrony with the vertical sync signals.

After deactivation of the strobe switch 86, or during intervals from one strobe-synchronized shot to another strobe-synchronized shot while the strobe switch 86 continues to be activated, the switches S1 to S5 are turned to the movie-side by the still controller 68 and shooting for movie is performed under the control of the movie controller 66. In this situation, the iris 28, CCD drive circuit 80, AGC circuit 36 and AWB circuit 54 are released from the conditions set for the strobe-synchronized shooting, and movie pictures continuing smoothly with one another are obtained. In particular, gain controller 108 becomes active at the value immediately preceding the activation of strobe switch 86 (FIG. 4). With reference to FIG. 8, see the first MOVIE frame after the STILL PICTURE on the IMAGE RECORDING line, wherein the reference gain is set back to 0 dB and the white balance is released from its set value.

To summarize this embodiment: when the strobe switch 86 is activated during movie shooting, the iris 28 is fixed in synchrony with the first vertical sync signal generated after the activation of the strobe switch 86; the shutter speed is changed to 1/100 sec. and the still controller 68 controls so that a flash of strobe light is terminated within the opening time of the shutter. Thereafter, in synchrony with the second vertical sync signal, amplifying gain in the AGC circuit 36 and gain for adjusting the white balance in AWB circuit 54 are changed to optimum values for strobe-synchronized shooting, and the image information focused on the CCD 30 is read. As a result, a series of strobe-synchronized picture images with constant brightness and a high image quality may be obtained, which are suitable, for instance, for evaluating a subject's golf swing, etc.

Printed images produced by an image reproducing apparatus provided with a video printer, etc. from the strobe-synchronized picture images obtained through the process stated above, are also bright and clear and free of blur because of the high shutter speed of 1/100 sec.

Further, an amplifying gain for image signals is retained at the value immediately preceding the strobe-synchronized shooting and employed immediately after the shot, and accordingly, no significant change in the amplifying gain for image signals occurs before and after the strobe-synchronized shot. As the retaining and employment of the amplifying gain for image signals are made in the blanking period of the vertical sync signal, continuity between images is sufficiently maintained, and image signals being processed with stable amplifying gains, result in good images being obtained.

By use of the movie camera according to an embodiment of the present invention, it is possible to obtain still images shot under a flash of the strobe light at constant intervals, which have always uniform brightness and image quality, because optimum shutter speed, amplifying gain and white balance are used. On the other hand, as movie images shot before and after the strobe-synchronized shot maintain good continuity therebetween, a movie of good quality is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A movie camera for shooting a movie and for shooting a still image during a temporary interruption of the movie shooting, said movie camera comprising:

(a) a photoelectric device for producing an image signal of color signals corresponding to light received from a subject;

(b) a shutter associated with said photoelectric device;

(c) optical means for receiving said light from a subject and controlling the passage of said light to said photoelectric device;

(d) a light source for emitting an electronic flash, to illuminate the subject;

(e) shutter speed and light source controlling means, responsive to the temporary interruption, for setting the speed of said shutter higher than when shooting the movie, and for controlling said light source so that said electronic flash is synchronized with the opening of said shutter and is terminated before the closing of said shutter;

(f) an amplifier for amplifying said image signal;

(g) switcher means for manually temporarily interrupting a movie shooting operation to perform said still image shooting during emission of said electronic flash, and automatically returning to the movie shooting operation upon completion of said still shooting operation;

(h) amplification controlling means for automatically controlling the amplification of said amplifier; and (i) white balancing means for adjusting the white balance of the color signals of the image signal corresponding to the still image shot during the temporary interruption, for color temperature of the electronic flash, wherein the image signal corresponding to the still image is recorded on the same recording medium as the image signal corresponding to the movie shooting, in proper chronology.

2. A movie camera according to claim 1, wherein said optical means comprises exposure controlling means for automatically controlling said optical means to adjust the amount of light received by said photoelectric device to obtain optimal exposure of the subject, and for controlling said amplifier to compensate when said optical means has been controlled to maximize the amount of light received and the amount of light received is still insufficient for optimal exposure.

3. A movie camera according to claim 1, wherein said optical means comprises exposure controlling means for automatically controlling said optical means to adjust the amount of light received by said photoelectric device to obtain optimal exposure of the subject, and for controlling said amplifier to compensate when said optical means has been controlled to maximize the amount of light received and the amount of light received is still insufficient for optimal exposure.

4. A movie camera according to claim 3, wherein said exposure controlling means maintains the state of said optical means immediately preceding said flash, throughout the duration of said flash.

5. A method of taking a still picture of subject with a movie camera normally shooting a video movie during a temporary interruption of shooting of the video movie, the camera having a shutter and photoelectric device, the method comprising the steps of:

(a) temporarily interrupting the shooting of the movie;

(b) opening and closing the shutter faster than when shooting the movie in response to the temporary interrupting of step (a);

(c) illuminating the subject by initiating a flash of light and then terminating said flash before said closing of said shutter in step (b);

(d) producing a still image signal of color signals corresponding to light received by the photoelectric device;

(e) adjusting the white balance of the color signals of the produced still image for color temperature of the flash; and (f) returning to the conditions of amplification and exposure prevailing before said interruption of movie shooting, wherein the still image signal is recorded on the same recording medium as an image signal corresponding to the movie shooting, in proper chronology.

6. A method according to claim 5, further comprising the step of amplifying said image signal at substantially the same level operating the movie shooting immediately preceding said interruption.

7. A method according to claim 5, further comprising the steps of controlling the passage of said light to obtain optimal exposure of the subject during the movie shooting and amplifying the image signal if said controlling fails to obtain optimal exposure during the movie shooting.

8. A method according to claim 5, further comprising the step of controlling the passage of said light during said flash to the same extent as immediately prior to said interruption.

* * * * *